United States Patent [19]

Woolley

[11] B 3,989,764

[45] Nov. 2, 1976

[54] PREPARATION OF AROMATIC NITROSO COMPOUNDS

[75] Inventor: John Mathers Woolley, Manchester, England

[73] Assignee: Imperial Chemical Industries Limited, London, England

[22] Filed: Sept. 4, 1973

[21] Appl. No.: 394,248

[44] Published under the second Trial Voluntary Protest Program on January 27, 1976 as document No. B 394,248.

[30] Foreign Application Priority Data

Sept. 14, 1972 United Kingdom............... 42693/72

[52] U.S. Cl............................ 260/647; 260/465 R; 260/592; 260/612 D
[51] Int. Cl.$^2$................... C07C 81/00; C07C 81/02; C07C 81/06
[58] Field of Search............... 260/647, 465 R, 592, 260/612 D

[56] References Cited
UNITED STATES PATENTS 3,578,720   5/1971   Dodman et al. .................... 260/467

*Primary Examiner*—Leland A. Sebastian
*Attorney, Agent, or Firm*—Cushman, Darby & Cushman

[57] ABSTRACT

A process for the manufacture of nitroso compounds of the benzene series which comprises heating an aromatic nitrobenzene compound with an aldehyde, ketone or alcohol in the presence of a catalyst having a lattice consisting of a heavy metal selected from antimony, bismuth, cerium, chromium, cobalt, copper, germanium, gold, iron, lanthanum, lead, manganese, mercury, molybdenum, neodymium, nickel, rhenium, silver, tantalum, thallium, thorium, tin, titanium, tungsten, vanadium and zirconium, in association with oxygen atoms or hydroxyl, carbonate or phosphate ions and having at least one other of said heavy metals forming impurity atoms in the lattice. This process is related to those described in U.S. Pat. Nos. 3,578,720 and 3,700,605 but replaces the carbon monoxide used as reducing agent by an aldehyde, ketone or alcohol, especially a lower aliphatic alcohol, with consequent advantages in lower toxicity and ease of control of the process. The preferred reducing agent is methanol.

7 Claims, No Drawings

PREPARATION OF AROMATIC NITROSO COMPOUNDS

This invention relates to a new reduction process and is more particularly concerned with a new and improved process for the reduction of aromatic nitro compounds to the corresponding aromatic nitroso compounds.

Our U.K. Specification No. 1,203,698 describes a process for reduction of aromatic nitro compounds to, inter alia, the corresponding aromatic nitroso compounds by treatment with carbon monoxide in the presence of catalysts which are mixed oxides, hydroxides, carbonates or phosphates of certain heavy metals. As explained in the Specification the catalysts concerned are believed to have a fundamental lattice consisting of atoms of one heavy metal in association with oxygen atoms or hydroxyl, carbonate or phosphate groups and that atoms of other heavy metals act as impurity in the lattice, so giving rise to the catalytic properties. The catalysts themselves are obtained by coprecipitation from solution or by heating together a mixture of the hydroxides or heat-unstable salts of the heavy metals.

Our U.K. Specification No. 1,259,504 describes a further process for manufacture of improved catalysts of this type containing manganese as one heavy metal and their use as catalysts in the reduction or aromatic nitro compounds with carbon monoxide.

It has now been found that the carbon monoxide used in these processes are reducing agent can advantageously be replaced in the case of nitrobenzene compounds by a ketone, aldehyde or more especially, an alcohol.

Thus, according to the invention, there is provided a process for the manufacture of nitroso compounds of the benzene series which comprises heating an aromatic nitrobenzene compound with an aldehyde, ketone or alcohol in the presence of a catalyst having a lattice consisting of a heavy metal selected from antimony, bismuth, cerium, chromium, cobalt, copper germanium, gold, iron, lanthanum, lead, manganese, mercury, molybdenum, neodymium, nickel, rhenium, silver, tantalum, thallium, thorium, tin, titanium, tungsten, vanadium and zirconium, in association with oxygen atoms or hydroxyl, carbonate or phosphate ions and having at least one other of said heavy metals forming impurity atoms in the lattice.

The catalysts can be obtained by the methods described in our U.K. Specification Nos. 1,203,698 and 1,259,504, the disclosures of which are hereby incorporated. The preferred catalysts are those containing a major proportion of manganese catalysts are those containing a major proportion of manganese and a minor proportion of lead as the metal atoms, and above all those containing manganese and lead in a ratio of 2 manganese atoms to 1 of lead. These preferred catalysts can be obtained, for example, by impregnating pumice granules with a mixture of manganese and lead nitrates and heating at 400°C to form the oxide; by reducing an aqueous alkaline solution of potassium permanganate with formaldehyde, washing free from alkali and treating with a water-soluble lead salt; in each case the amounts being such as to give a Mn:Pb ratio of 2:1. A further preferred catalyst is obtained by heating manganese carbonate which has previously been impregnated with a solution of lead nitrate or lead acetate in a Mn:Pb ratio of 1:8, at 400°C.

As nitrobenzene compounds which may be reduced, there may be mentioned, for example mono- and dicyclic compounds of the benzene series containing $NO_2$ substituted on one or both benzene rings, e.g.

o-, m- and p-nitrotoluenes,
p-nitrochlorobenzene,
p-nitroethylbenzene,
p-nitrobutylbenzene,
m-nitrobenzonitrile,
m- and p-nitroanisole,
4-nitrodiphenyl,
4-nitrodiphenylether,
m-nitroacetophenone,
p-nitrobromobenzene,
3,4-dichloronitrobenzene, but preferably nitrobenzene itself.

As aldehydes, ketones and alcohols which may be used as reducing agents, there may be mentioned, for example, acetaldehyde, methaldehyde, propionaldehyde, n-butyraldehyde, iso-butyraldehyde, acryloyl aldehyde, acetone, methyl ethyl ketone, methyl isopropyl ketone, butan-2-ol, alkyl alcohol, 2-methylpropan-2-ol, 2-methylbutan-2-ol, pentan-3-ol and ethylene glycol.

Preferably, however, there is used a lower aliphatic primary alcohol, e.g. n-butanol, n- or iso-propanol, ethanol or above all, methanol.

In general the reduction may be carried out at a temperature of from 180°C upwards and is preferably slightly above the boiling point of the nitro compound used, since it is desirable to remove the nitroso compound from contact with the catalyst as soon as possible after formation to avoid side reactions, especially over-reduction. In the preferred case of nitrobenzene, for example a temperature of just above the boiling point, i.e. 215° to 225°C is preferred. In general it is preferred to avoid temperatures above 260°C, and it may be desirable to effect reaction at a sub-atmospheric pressure so that the nitro and/or nitroso compound distil at a temperature below this.

Reduction of nitro compounds by the new process may be carried out by continuous or batchwise techniques. A variety of techniques are possible, subject to the physical state of the starting materials at the temperature at which the nitro compound and reducing agent are brought into contact with the catalyst. Where the reaction mixture would otherwise be solid at this temperature, it is necessary to add an inert liquid diluent, e.g. chloro- or dichloro-benzene. Such diluents may be added to liquid reaction mixtures if desired, or may be used to dissolve solid reactants so that the latter can be added conveniently to the reaction mixture, especially in continuous processes.

In one embodiment the process can be carried out by passing a mixture of the nitro compound and the reducing agent either in the liquid phase (i.e. in the liquid or molten state) or in solution or in the vapour phase through or over a bed of the catalyst. Fixed bed or fluid bed techniques may be used. The preferred catalyst for operation in the vapour phase is one obtained by heating the nitrates or manganese and lead in the ratio of 2 atoms of Mn to 1 atoms of Pb on a pumice support.

Other techniques are possible for continuous operation in the liquid phase. For example, the nitro compound and reducing agent can be introduced separately or in admixture into a refluxing suspension of the catalyst and nitro compound at such a rate as to equal the rate of distillation. To avoid the build up of high boiling impurities in such processes it is desirable to periodically remove part of the still contents, filter off the catalyst from the liquid and return the catalyst and fresh nitro compound to the still.

The preferred catalysts for operating in the liquid phase are those made by heat decomposition of a mixture of manganese carbonate and lead nitrate or acetate or by alkaline reduction of potassium permanganate followed by treatment with lead nitrate as described above.

The nitroso compound will normally be obtained in the form of a solution or suspension in the nitro compound, and possibly water and/or excess reducing agent. In the case of nitrobenzene/nitrosobenzene mixtures, the nitrosobenzene may be submitted directly to any additional chemical reaction e.g. dimerisation to nitrosodiphenylhydroxylamine, without isolation; however if isolation is desired, this can be effected by known methods, e.g. by steam distillation to give a more concentrated mixture followed by freezing and sweating techniques.

The new process has a number of advantages over those described in our U.K. Specification Nos. 1,203,698 and 1,259,504. When using carbon monoxide, the conditions necessary to obtain the nitroso compound without substantial amounts of over-reduction products are very critical and need careful control. However when using lower alkanols and especially methanol as the reducing agent, the tendency to over-reduce is much less and better yields of nitroso compound are obtainable. Again, methanol is cheap, readily available and transportable and offers economic advantages in this respect. Finally, the plant needed to carry out the reduction is much simpler than with carbon monoxide, which being a gas with adverse physiological properties requires that precautions must be taken to re-cycle or absorb any excess and to pretect operatives against inadvertant leakages.

The invention may be illustrated, but not limited, by the following Examples in which the percentages are by weight:

EXAMPLE 1

Vapour Phase Reaction : Preparation of catalyst

Manganese nitrate $Mn(NO_3)_2 6H_2O$ (M.W. 287) 287 g = 1 mol (Mn M.W. = 55) is dissolved in 100 ml of water at 50°, cooled and the volume adjusted to 500 ml. This is a stock solution of manganese.

16.6 g of lead nitrate $Pb(NO_3)_2$ M.W. 332 = 1/20 mol is dissolved in 100 ml water at 80°. To this is added 50 ml of the stock manganese solution = 1/10 mol to give a ratio of 2 atoms manganese to 1 atom of lead. The solution is now added to 125 ml (approx. 50 g) of pumice granules of size passed by a sieve with 8 meshes to the inch and retained by a sieve with 22 meshes to the inch. The impregnated pumice is dried at 100° with occasional stirring and then heated at 400° until the evolution of nitrous fumes has ceased. After cooling the catayst is ready for use.

Procedure

The unit used consists of a vessel of stainless steel or glass of 250 ml capacity (the boiler) in a heating mantle to which is fitted a vertical tube 50 cm long and of 20 mm internal diameter which is electrically heated and has thermocouples at intervals for temperature control. The top of the tube leads to a water cooled condenser and receiver. The tube is packed with approximately 125 ml of catalyst and has an inlet for nitrobenzene/methanol mixture 10 cm from the bottom. In use, approximately 100 ml of nitrobenzene is charged to the boiler, the catalyst bed is heated to 215° and the vessel contents are raised to the boil (212°). A solution of methanol (5 parts) in nitrobenzene (100 parts) is pumped into the catalyst column at a rate of approximately 100 ml/hr and the heat input to the column and boiler adjusted so that the resulting nitrobenzene in nitrobenzene solution distils from the top of the catalyst column at this rate. During start-up hot spots may develop in the catalyst, these are controlled by stopping the methanol-nitrobenzene feed temporarily and flushing with nitrogen.

Under steady state conditions a solution of nitrobenzene containing 15% of nitrosobenzene distils at the rate of approximately 100 g (= 15 g nitrosobenzene) per hour with an efficiency of conversion of 95% on the nitrobenzene consumed. High boiling by-products collect in the boiler and when the temperature required to maintain at the boil reaches 220°, the contents of the boiler are removed and replaced by fresh nitrobenzene. Nitrobenzene can be recovered from these residues by distillation for re-use in the process. The other by-products, water and carbon dioxide resulting from the oxidation of the methanol distil over with the nitrosobenzene.

In place of ths lead-manganese catalyst there may be used a silver-manganese catalyst prepared in the same way but replacing the lead nitrate by 8.5 g of silver nitrate, or a cobalt-manganese catalyst made by replacing the lead nitrate by 14.6 g of cobalt nitrate $Co(NO_3)_2 6H_2O$. These catalysts give lower conversion rates than the lead-manganese catalysts (5–10 percent per hour).

EXAMPLE 2

Liquid Phase Reaction : Preparation of catalysts

1. A solution of 79 g (0.5 mol) of potassium permanganate and 24 g of potassium hydroxide in 4 litres of water is prepared at room temperature. To this is added 60 g of kieselguhr (Hiflow Supercel registered trade mark) and after stirring for 10 minutes 30 ml of 40% formaldehyde is added all at once. A bulky hydrated precipitate of approximate composition $K_2Mn_2O_5$ forms, this is filtered and washed with two portions of 500 ml each of water. After pressing the filter cake to remove as much as possible of the entrained water, the cake is transferred to a vessel with 1.5 litres of water and stirred until complete dispersion results. Lead nitrate is added in ca. 5.0 g portions until the following test is satisfied. A sample is spotted onto filter paper and a drop of 5 percent solution of sodium sulphide is placed alongside so that this runs out to join the clear run out from the first spot. A brown line at the spot is intersection indicates the presence of excess lead in solution showing that all the potassium in the precipitate has now been replaced by lead to give a product of approximate composition $PbMn_2O_5$. About 80 g of lead nitrate is required. The solid is filtered and washed with 4 × 500 ml portion of water and dried at 100° to give 130 g of catalyst ready for use.

The lead nitrate may be replaced by silver nitrate (43 g) or copper nitrate (73 g) to give less active catalysts.

2. 41 g of lead nitrate (⅛ mol) is dissolved in 80 ml of hot water. Into this solution is stirred 115 g of manganese carbonate (1mol) and the resulting paste is dried at 100° with frequency mixing to give a homogeneous product. The product is then heated at 400° until all evolution of nitrous fumes has ceased. After cooling, 105 g of a black, finely-divided powder catalyst is obtained.

In place of the lead nitrate, 25 g of silver nitrate may be used to give a silver-manganese oxide catalyst. Lead acetate may be used in place of lead nitrate, to avoid nitrous fuming but because it is not as soluble as lead nitrate more attention is necessary at the drying stage to produce a homogeneous product.

Procedure

On an electrically heated mantle is placed a 250 ml flask equipped with an efficient stirrer, thermometer, inlet for methanol/nitrobenzene mixture, and outlet connected to a water cooled condenser and receiver. Into the flask is placed 100 ml of nitrobenzene and 20 g of lead-manganese catalyst prepared either by method (1) or (2) and the temperature raised to the boil (212°) with stirring. Initially water and nitrobenzene distil as the catalyst dries out, and when no more water distils a mixture of methanol (5 parts) and nitrobenzene (100 parts) is pumped in at a steady rate by means of a Hughes micro-pump at a rate of approximately 100 ml/hr. Heat input to the flask is adjusted so that distillation is at a corresponding rate and the volume of the flask contents remains constant. A solution of nitrosobenzene (15 g) in nitrobenzene (85–95 g) with traces of water (4 g) collects in the receiver. An efficiency of 95 percent yield on the nitrobenzene consumed is a typical result. High boiling impurities remain in the flask and at 12 hour intervals approximately half the contents are removed, filtered and the fiter residues comprising part of the catalyst are returned to the flask with a make up volume of fresh nitrobenzene. The filtrates can be distilled for recovery of nitrobenzene for re-use in the process.

In place of the lead-manganese catalyst there may be used a silver-manganese catalyst which gives lower conversions (approximately 10 g production of nitrosobenzene per hour) but higher efficiency (98 percent).

EXAMPLE 3

In place of the methanol-nitrobenzene feed stock of Examples 1 or 2 there may be used a mixture of 5–10 parts of ethanol in 100 parts of nitrobenzene. Conversion rates are not as high, with a nitrosobenzene production rate of 5–10 g/hr.

Other alcohols such as propanol, iso-propanol and ethylene glycol, or other oxidisable compounds such as acetone or acetaldehyde also are effective in place of methanol.

EXAMPLE 4

Instead of using a mixture of methanol and nitrobenzene as feed stock in the Examples 1 and 2, each may be measured in separately as individual feeds. This procedure enables the optimum proportions of methanol to nitrobenzene to be determined for the particular apparatus and catalyst used.

The methanol addition then may be either by a liquid feed, or alternatively it may be carried into the reaction zone by means of an inert gas such as nitrogen. This technique provides a means of preparing a high strength nitrosobenzene solution if used in conjunction with a fractionating head on the reaction column of Example 1 or the reaction vessel of Example 2 as the nitrogen gas stream serves to carry the more volatile nitrosobenzene away from the less voltile nitrobenzene. Strengths of 40 percent or more of nitrosobenzene in nitrobenzene may be prepared in this manner.

EXAMPLE 5

In place of the nitrobenzene in the previous Examples there may be used other nitro compounds for example o-nitrotoluene,
p-nitrotoluene,
2-chloronitrobenzene,
3-chloronitrobenzene,
4-chloronitrobenzene,
3-nitroanisole,
4-nitroanisole,
4-nitrophenetole, in each case the corresponding nitroso compound is produced.

In the case of solid nitro compounds for example p-nitrotoluene, operation of the process is facilitated by using a solution of the nitro compound in an inert liquid solvent of boiling point in the range 150°–220°, for example using as feed stocks in Example 1 or Example 2 o-dichlorobenzene (B.P. 179°)(50 parts), p-nitrotoluene (m.p. 52°) (100 parts), methanol (5 parts). Both feed stock and distillate then remain fluid at ambient temperatures, making handling of each much easier in operation and avoiding the necessity of heated pipe lines to keep feed stock and distillate fluid.

What we claim is:

1. In the process for manufacture of nitroso compounds of the benzene series by heating an aromatic nitrobenzene compound with a reducing agent in the presence of a catalyst having a lattice consisting of a heavy metal selected from antimony, bismuth, cerium, chromium, cobalt, copper, germanium, gold, iron, lanthanum, lead, manganese, mercury, molybdenum, neodymium, nickel, rhenium, silver, tantalum, thallium, thorium, tin, titanium, tungsten, vanadium and zirconium, in association with oxygen atoms or hydroxyl, carbonate or phosphate ions and having at least one other of said heavy metals forming impurity in the lattice, the improvement comprising using as the sole reducing agent a member selected from the group consisting of lower aliphatic primary alcohols.

2. A process as claimed in claim 1 wherein the catalyst contains a major proportion of manganese and a minor proportion of lead as the metal atoms.

3. A process as claimed in claim 2 wherein the manganese-to-lead ratio is 2:1.

4. A process as claimed in claim 1 wherein the aromatic nitrobenzene compound is nitrobenzene itself.

5. A process as claimed in claim 1 wherein the alcohol is methanol.

6. A process as claimed in claim 1 wherein the reduction is carried out at a temperature of from 180° to 260°C.

7. A process as claimed in claim 6 wherein a temperature of 215°–225°C is used.

* * * * *